United States Patent
Gould

(10) Patent No.: US 8,151,056 B2
(45) Date of Patent: Apr. 3, 2012

(54) UPDATING DATA WITHIN A BUSINESS PLANNING TOOL

(75) Inventor: Michael Peter Gould, York (GB)

(73) Assignee: Anaplan, Inc., Redwood City, CA (US)

( * ) Notice: Subject to any disclaimer, the term of this patent is extended or adjusted under 35 U.S.C. 154(b) by 363 days.

(21) Appl. No.: 12/621,802

(22) Filed: Nov. 19, 2009

(65) Prior Publication Data

US 2010/0131715 A1  May 27, 2010

Related U.S. Application Data

(60) Provisional application No. 61/116,678, filed on Nov. 21, 2008.

(51) Int. Cl.
*G06F 12/00* (2006.01)
(52) U.S. Cl. ............................ 711/129; 705/7.12
(58) Field of Classification Search .............. 711/129; 705/7.12
See application file for complete search history.

(56) References Cited

U.S. PATENT DOCUMENTS

| | | | |
|---|---|---|---|
| 7,609,624 B2 * | 10/2009 | Alicherry et al. | 370/228 |
| 7,698,316 B2 * | 4/2010 | Song et al. | 707/608 |
| 2008/0172269 A1 * | 7/2008 | Senan et al. | 705/7 |

* cited by examiner

*Primary Examiner* — Hashem Farrokh
(74) *Attorney, Agent, or Firm* — Coats & Bennett, P.L.L.C.

(57) ABSTRACT

A apparatus is provided for updating data within a business planning tool. The apparatus comprises a computer memory (22) arranged to store operational data in a plurality of line items (50), each line item (50) being arranged to represent operational data in data cells (52) occupying space in a plurality of dimensions (X, Y), and each line item (50) having data cells in a first dimension (Y) configured to represent the operational data in a at least one hierarchy level, and having data cells in a second dimension (X) arranged to represent the respective operational data over at least one time period. A processor (24) is arranged to partition each line item (50) into data blocks (60) comprising one or more data cells (52) by identifying and grouping data cells (52) which belong to a single hierarchy level within the first dimension (Y) and a single time period within the second dimension (X), to create a dependency graph having a node for each data block (60) and which represents the inter-dependency of the data blocks (60) and in which there are no internal dependencies within a data block; and to update the data blocks (60) based on the dependency graph when at least one data cell is changed. In this way, an efficient updating apparatus is achieved.

13 Claims, 6 Drawing Sheets ial application identified by App. No. 61/116,678, which
UPDATING DATA WITHIN A BUSINESS PLANNING TOOL

RELATED APPLICATIONS

This application claims priority from the U.S. provisional patent application identified by App. No. 61/116,678, which was filed on 21 Nov. 2008.

TECHNICAL FIELD

The invention relates to computer-implemented business planning tools, and more particularly to an apparatus and method for updating data within a business planning tool. In particular, but not exclusively, the invention finds utility in a business planning tool where the data is representative of commercial activity or performance.

BACKGROUND

When designing a computer-based system to implement a planning model, a question arises as to how to update the planning model. An update may be required to reflect changes to the data contained in the planning model, or the structure of the planning model, or derivations used within the planning model.

To illustrate, a spreadsheet is an example of a computer-based planning tool. A spreadsheet comprises one or more worksheets, each of which serves to organise cells into a grid consisting of rows and columns. Each cell contains alphanumeric text or a numeric value. Alternatively, each cell may contain a formula that defines how the content of that cell is to be derived from any other cell or combination of cells. If a change is made to any of the cells, the spreadsheet must be updated. Spreadsheets are frequently used as tools for handling financial information because of their ability to re-calculate themselves automatically after a change to one or more cells has been made.

Typically, spreadsheets are updated using a dependency graph. The dependency graph records (i) what other data needs to be recalculated as a result of a change, and (ii) which formula is to be used to carry out the recalculation. For example, the dependency graph records that the data in CELL A is calculated from the sum of CELL B and CELL C. So if the contents of CELL B or CELL C change, the content of CELL A must also change to reflect this.

Similarly, if the derivation of CELL A changes from the sum of CELL B and CELL C to the difference of CELL B and CELL C, the content of CELL A must also change to reflect this.

Similarly, if the derivation of CELL A changes from the sum of CELL B and CELL C to the difference of CELL B and CELL C, the content of CELL A must also change to reflect this.

This process of updating using a dependency graph is relatively simple, and it is possible to know exactly what is happening in an update cycle.

This approach is known as a cell-level approach, and the resulting dependency graph uses a node to represent each cell in the spreadsheet.

However, there is a problem when planning tools are large, for example greater than a million cells in size. Not only does cell data need to be stored, but a dependency graph having a node for each cell also needs to be calculated and stored. This results in increased overhead in the system impacting on performance and cost. This problem becomes pronounced with increasing cell count.

Alternative business planning tools exist which manage dependencies using a higher-than-cell-level approach. An example is the IBM Cognos 8 planning tool (Cognos in a registered trade mark owned by Cognos Incorporated of Canada). The IBM Cognos 8® planning tool is based on a Cube/Dimension/Link paradigm. The higher-than-cell-level approach partitions data into cubes, wherein each cube contains one or more (usually many more) cells of data. Partitioning data in cubes reduces the size of a corresponding dependency graph by reducing node count and thereby reduces overhead.

Tracking dependencies between cubes results in a smaller dependency graph but there is a potential for circularity between dependent cubes during the update cycle. Circularity occurs when a two cubes are each dependent on one another in some respect. It is important to note that at cell level, circularity need not actually exist. It is by partitioning at a higher-than-cell-level that apparent circularity is introduced. The potential for circularity in the dependency graph introduces complexity into the updating process and in some cases may require the same cube to be revisited many times during a single update cycle.

Dependencies between cells within each cube also exist and need to be handled. This results in a more complex set of dependencies which are difficult to identify and handle. In particular, there may be complex interactions between the dependencies within each cube and the interdependencies between cubes. A relatively complex updating process results, in which changes must be analysed to determine whether other dependent cubes must also be recalculated. This results in a slower updating process.

In addition to the above, the added complexity makes the partitioning methods very difficult to use in updating processes utilising multi-threaded calculation engines.

Therefore, there is a commercial need for a system which addresses the technical problems associated with the partitioning methods described above. In particular, a data partitioning system is required which results in a relatively simple, elegant and efficient updating process leading to much quicker updates.

An aim of the invention is to provide such a data partitioning system. At the very least, it is an aim of the invention to provide a system which attempts to solve one or more of the above-mentioned problems with the prior art.

SUMMARY OF THE INVENTION

According to the present invention there is provided a apparatus, method and computer readable recordable medium as set forth in the appended claims. Other features of the invention will be apparent from the dependent claims, and the description which follows.

Broadly speaking, the invention provides an apparatus and method able to partition data stored in a particular structure into data blocks in such a way that no internal dependencies exist within a data block. The apparatus and method then creates a directed acyclic dependency graph.

According to one aspect of the invention, there is provided an apparatus for updating data within a business planning tool, the apparatus comprising:

a computer memory arranged to store operational data in a plurality of line items, each line item being arranged to represent operational data in data cells, the data cells occupying space in a plurality of dimensions and being arranged to store either primary data sourced externally from the apparatus or secondary data derived from other data cells within the apparatus, and each line item having data cells in a first dimension configured to represent the operational data in at least one hierarchy level which consists of data cells arranged to store either primary data or secondary data, and each line item having data cells in a second dimension arranged to represent the respective operational data over at least one time period; and a processor arranged to:

(i) partition each line item into data blocks comprising one or more data cells by identifying and grouping data cells which belong to a common hierarchy level within the first dimension and a single time period within the second dimension so that all data cells within each data block either contains primary data or secondary data derived from data cells in one or more other data blocks;

(ii) create a directed acyclic dependency graph having a node for each data block and which is arranged to represent the inter-dependency of the data blocks; and (iii) update the data blocks based on the directed acyclic dependency graph when at least one data cell is changed.

In this way, a relatively simple and efficient system for updating data within a business planning tool is provided. This relatively simple and efficient system is achieved by partitioning data cells of line items within separate hierarchy levels and separate time periods into data blocks. By partitioning in this way, a manageable node count is achieved (lower that the cell-level approach) while at the same time achieving a directed acyclic graph without other forcing methods (an advantage over the known higher-than-cell-level approach). Updating speeds are significantly increased.

Advantageously, at least one line item of the plurality of line items exists in a plurality of different versions, and the processor is arranged to partition the respective line items of different versions by identifying and grouping data cells which correspond to a single version. In this way, the system is flexible enough to cope with users having different versions of parts of a planning model, that is, different versions of line items to reflect different circumstances.

Preferably, the processor is arranged to identify and group data cells into coarser partitions under one or more predetermined conditions which ensure that all data cells within each data block contain either primary data or secondary data derived from data cells in one or more other data blocks. In this way, the node count in the dependency graph could be further reduced without introducing complex dependencies in the dependency graph, and thus maintaining the acyclic nature of the graph.

Preferably, a predetermined condition is that data cells belonging to two or more independent time periods and a common hierarchy level within a line item are identified and grouped into a data block. This provides the advantage of reducing node count in the dependency graph Preferably, a further condition is that, where the time dimension comprises a plurality of hierarchy levels, data cells which belong to different time hierarchy levels are identified and grouped into separate data blocks. In this way, if a hierarchy exists in the time dimension, unwanted internal dependencies within data blocks can be avoided.

Preferably, a predetermined condition is that two or more line items share a common structure and have data entry at a leaf level in the hierarchy, and the data cells from respective corresponding levels in the hierarchy from the two or more line items are identified and grouped into a data block. Again, this provides the advantage of reducing node count in the dependency graph.

Preferably, a predetermined condition is that, within a line item, data cells within non-leaf hierarchy levels in a single dimension are identified and grouped into a data block, and data held within the data block is re-expressed in terms of leaf-level data.

Preferably, the processor is arranged selectively to update data cells within the data blocks by recording, for each data block affected by a user change, a selective list containing a list of affected data cells within the respective data block. Preferably, the processor is arranged selectively to update data cells within the data blocks by mapping changes through the apparatus using the dependency graph; and identifying, for each dependent data block to be updated, if predecessor data blocks exist which are to be selectively updated, and if so requesting the corresponding selective list or lists and transforming the corresponding selective list or lists into a selective list of affected cells for the respective dependent data block; and recalculating the data cells within each dependent data block to be updated using the respective selective list of affected cells.

In this way, cell-level-update granularity is achieved. In other words, not every data cell in a data block need be recalculated. In some cases, it may be more efficient to recalculate all cells in a data block as this will be quicker than determining which data cells are affected. However, the cell-level update is very effective when a single cell or relatively few cells in each data block has changed.

Advantageously, the processor is arranged to update all data cells within a data block if more than a predetermined portion of data cells are affected. In this way, the system is more efficient. By not updating data blocks at a cell level when more that a predetermined number of data cells are affected, the processes of merging and transforming the selective lists of predecessor data blocks is avoided. This is particularly useful where the process of merging and transforming would take more resources than a full data block update.

Preferably, the processor is arranged not to record a selective list for a data block if more than a predetermined portion of data cells are affected. In this way, an elegant mechanism is provided for preventing increasingly large selective lists from propagating through the system during an update process. This is particularly useful where a change to a small number of data cells grows to become a relatively large and expensive change in subsequent areas of the dependency graph.

According to another aspect of the invention, there is provided a method of updating data within a computer-implemented business planning tool, the method comprising:

arranging and storing in a computer memory operational data in a plurality of line items, each line item being arranged to represent operational data in data cells, the data cells occupying space in a plurality of dimensions and being arranged to store either primary data sourced externally from the business planning tool or secondary data derived from other data cells within the business planning tool, and each line item having data cells in a first dimension configured to represent the operational data in at least one hierarchy level which consists of data cells arranged to store either primary data or secondary data, and each line item having data cells in a second dimension arranged to represent the respective operational data over at least one time period;

partitioning each line item into data blocks comprising one or more data cells by identifying and grouping data cells which belong to a common hierarchy level within the first dimension and a single time period within the second dimension so that all data cells within each data block either contains primary data or secondary data and if secondary data, then the secondary data is derived from data cells in one or more other data blocks;

creating a directed acyclic dependency graph having a node for each data block and which is arranged to represent the inter-dependency of the data blocks; and updating the data blocks based on the directed acyclic dependency graph when at least one data cell is changed.

Preferable features of the method are inferable from the above optional features listed in respect of the corresponding apparatus.

According to another aspect of the invention, there is provided a computer readable recording medium having recorded thereon instructions for carrying out the above method.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed below, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION OF THE EXEMPLARY EMBODIMENTS

Exemplary embodiments of the invention are now described, by way of example only, with reference to the accompanying drawings.

Figure 1:
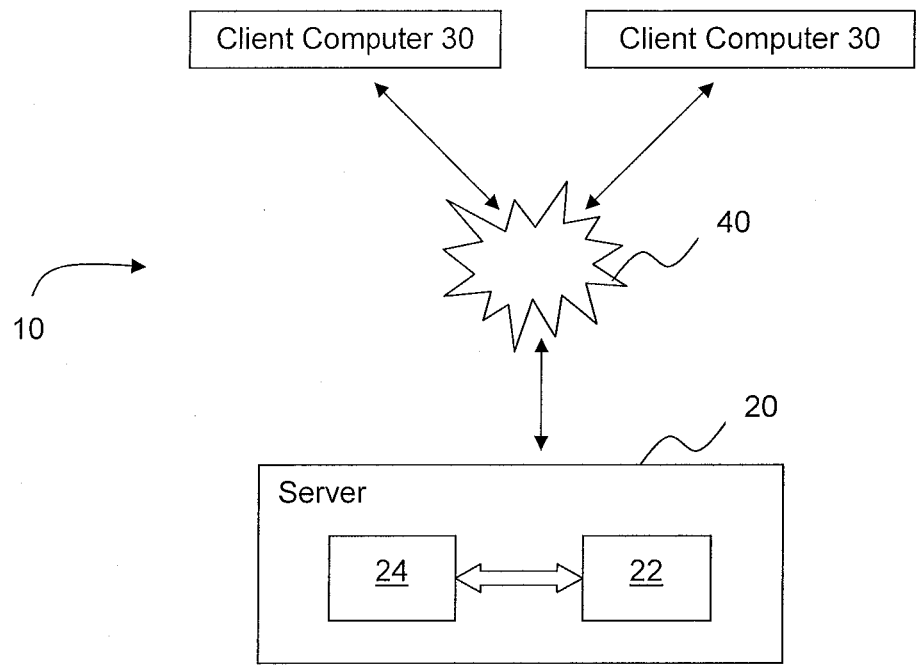
FIG. 1 is a schematic overview of a business planning tool according to the invention.

With reference to FIG. 1, a schematic overview of a computer-implemented business planning tool 10 is shown. The business planning tool 10 comprises a server 20 connected to a plurality of client computers 30 through a computer network 40.

The server 20 is arranged to store and process the main elements of the business planning tool 10, including all of the business planning tool 10 functions and operational data. The client computers 30 are arranged to access the business planning tool 10 via the computer network 40 and are able to send configuration and update commands to the server 20 in order to update the business planning tool 10.

In particular, the server 20 comprises a computer memory 22, such as random access memory (RAM), arranged to store system data, including operational data specific to the business planning tool 10. The server 20 also comprises a processor 24 which is arranged to execute computer-executable instructions which bring the business planning tool 10 to life. In practice, a user can create one or more business planning models using the business planning tool 10, and can manipulate the structure of each business planning model and data within each model. The structure of a business planning model is changed by redefining how data interacts to produce a desired set of outputs from a defined set of inputs. Data within each model is changed either by redefining how data is derived (if secondary data) or by changing the data values themselves (if primary data).

The computer-executable instructions define how the business planning tool 10 operates. For example, the computer-executable instructions, when run on a computer, (a) define and create data storage elements, or line items, for storing operational data; (b) define how the operational data interrelates with other operational data; (c) define how data is input to and output from the business planning tool 10; and (d) define how data is updated in response to user manipulation of a business planning model. This invention focuses on (d), how data is updated in response to user manipulation of a business planning model.

With this in mind, it is useful to define a fundamental data storage element which is important to developing an understanding of the invention. The fundamental data storage element is called a line item and at a general level is defined as a structured set of data values representing operational data. In the exemplary embodiment, operational data represents recognisable activities within a business or enterprise, that is, things that drive or measure business performance. Line items are used to represents a business driver, business account or a business measurement. Some examples of line items envisaged by the inventors are listed in Table 1.

In the system of the present invention, the computer memory 22 is arranged to store the operational data in a plurality of line items 50. Each line item is arranged to represent operational data in data cells occupying space in a plurality of dimensions. Each line item has data cells in a first dimension configured to represent the operational data in at least one hierarchy level, and has data cells in a second dimension arranged to represent the respective operational data over at least one time period.

Figure 2:
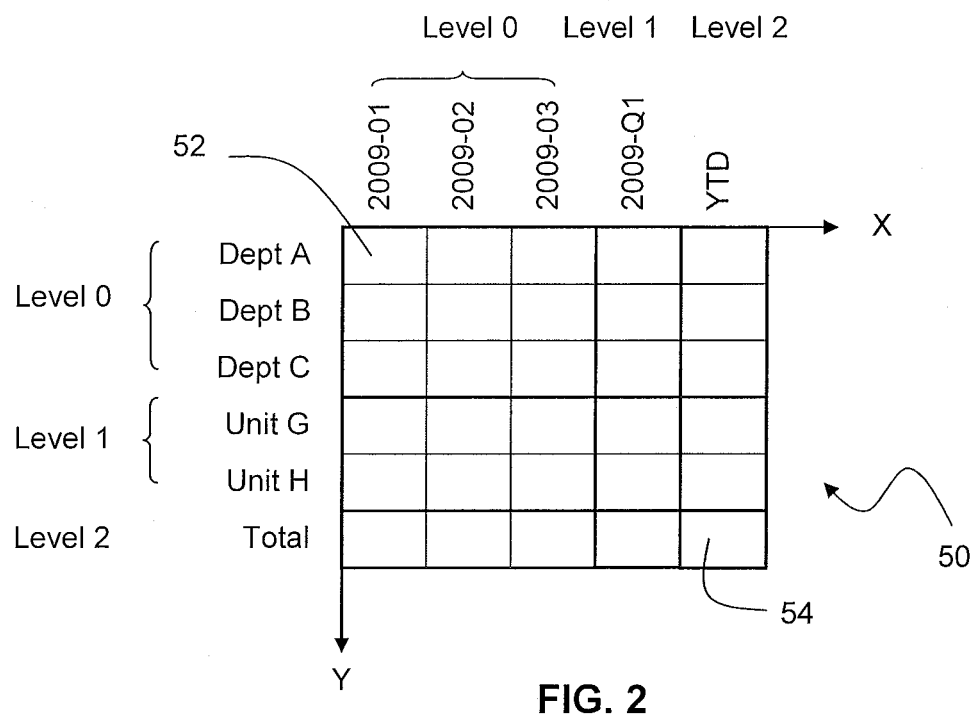
FIG. 2 is a schematic view of an exemplary line item.

A relatively simple line item 50 is shown in schematic form in FIG. 2.

Here, the line item 50 is arranged to represent operational data in data cells 52 in two dimensions, namely dimension X and dimension Y.

TABLE I

| Line Item | Type |
| --- | --- |
| Units Sold | Business Driver - Used to model revenue and direct costs |
| Sales Tax Rate | Business Driver - Used to calculate sales tax |
| Headcount | Business Driver - Used to calculate future employees costs |
| Revenue | Business Account - Income |
| Cost of Goods Sold | Business Account - Expenses |
| Trade Creditors | Business Account - Liability |
| Cash at Bank | Business Account - Assets |
| Gross Margin Percentage | Business Measurement - a key ratio |

In practice, each data cell 52 of the line item 50 is arranged to contain operational data such as expected sales information relating to the number of products sold by an enterprise or business. Therefore, it is advantageous to have sales data available at various levels of detail, or resolutions.

For example, it is useful that projected sales data is available for each department, each business unit, and for all departments and business units. This data is represented in three hierarchy levels, as shown along dimension Y. In this example, level 0 is arranged to hold sales information for each department, such as "Department A", "Department B" and "Department C". Level 1 is arranged to hold projected sales information for each business unit, such as "Business Unit G" (including departments A and B) and "Business Unit H" (including department C). Level 2 is the top-level and is arranged to hold projected sales information for all departments and business units.

Also, it is useful that projected sales information is available for each accounting period. This data is represented in three hierarchy levels, as shown along dimension X. In this example, level 0 is arranged to hold sales information for each time period, such as January 2009 ("2009-01"), February 2009 ("2009-02") and March 2009 ("2009-03"). Level 1 is arranged to hold sales information for a cumulative time period, in this case the first quarter of 2009 ("2009-Q1"). Level 2 is arranged to old sales information for a second cumulative time period, in this case year-to-date figures ("YTD").

In total, the line item 50 contains thirty data cells 52. Some data cells 52 contain data either entered by a user directly, or imported form another application into the business planning tool 10 (referred to as primary data), or derived from another line item (referred to as secondary data).

All data cells 60 in each hierarchy level usefully contain data cells arranged to store data of the same type, that is primary data or secondary data.

Data at the lowest hierarchy levels in the line item 50 is known as leaf-level data. In the example given, leaf-level data is contained in the data cells 52 relating to level 0 of dimension Y and level 0 of dimension X. In other words, the leaf-level data relates to the basic projected sales information for each product line and for each basic time period.

Whilst not shown in FIG. 2, there may be additional dimensions to the line item 50. For example, there may be a dimension to represent the sales information for each department in terms of the products sold. Within that dimension, there may be a series of hierarchy levels. Level 0 may represent product X, product Y and product Z. Level 1 may be for product group detail. Level 2 may represent the total for all products.

Of course, line items 50 may exist containing only a single data cell 52, or having only one hierarchy level in a single dimension.

A data cell 54 is located where the two highest-level hierarchy levels meet at the bottom right corner of the line item. Preferences may be set to determine how this data cell is calculated, either from the data contained in the X dimension or data contained in the Y dimension.

Figure 3A:
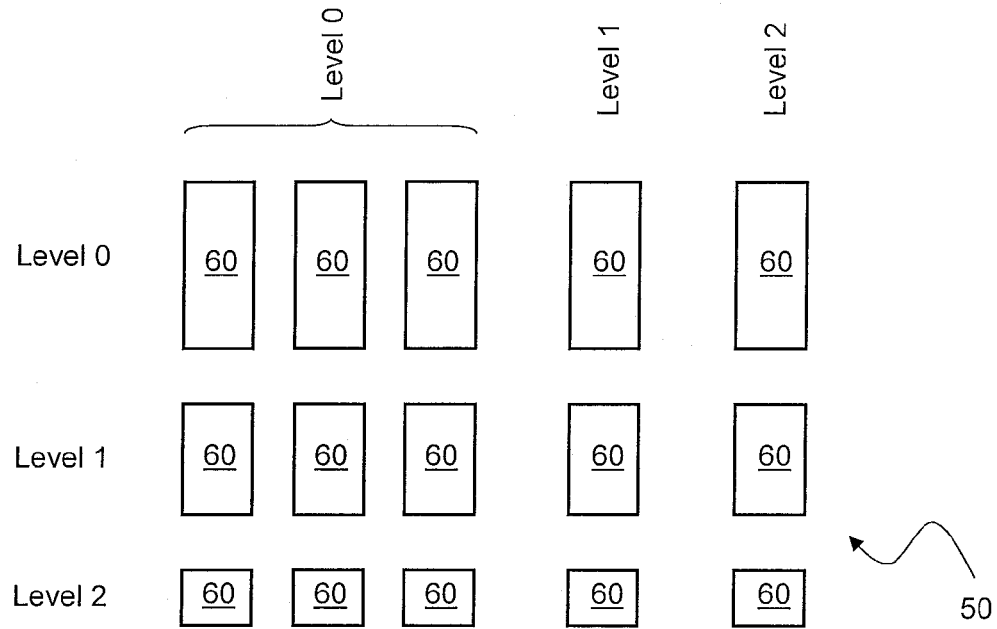
FIG. 3(a) is a schematic view of the exemplary line item of FIG. 2 partitioned into a number of data blocks.

FIG. 3(a) is a schematic diagram which illustrates how the processor 24 is arranged to partition the exemplary line item 50 into a plurality of data blocks 60.

According to the invention, the processor 24 is arranged to identify and group data cells 52 which belong to a single time period in dimension X. In this example, each time period within level 0 is partitioned out of the line item 50. Also, each time period within other hierarchy levels are partitioned separately, such as 2009-Q1 and YTD, respectively. Although not shown, this data would be partitioned separately from 2009-Q2 should that data exist.

By contrast, the level of partitioning in dimension Y is to a hierarchy level. In other words, department data, that is for department A, department B and department C are partitioned into a single data block. All business unit data is also partitioned together. The total projected sales information data is likewise partitioned in a separate data block. In this way, all data cells within each data block contain either primary data or secondary data. Of course, the product line, product group and total product data is partitioned by each time period as discussed above.

In this example, the data cells 52 of the line item 50 are partitioned into fifteen data blocks 60.

Figure 3B:
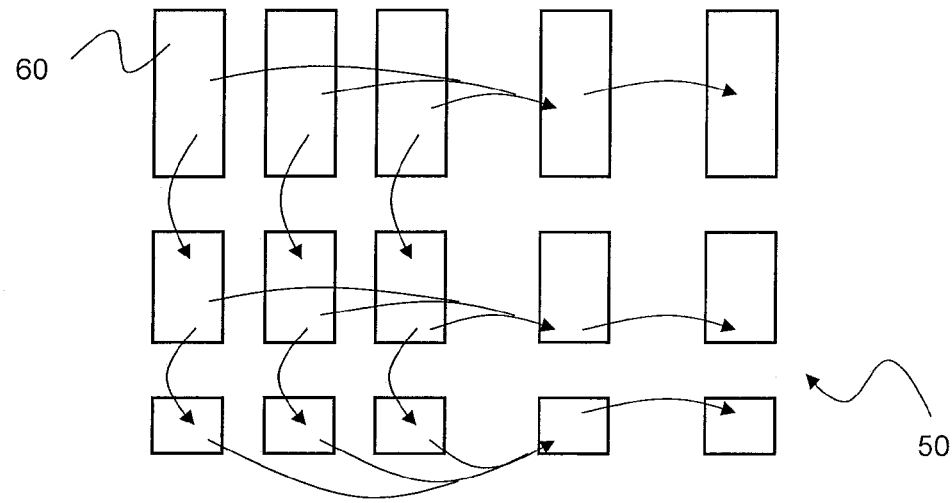
FIG. 3(b) is a schematic view of a dependency graph associated with the data blocks of FIG. 3(a)

FIG. 3(b) shows, using arrows, a directed acyclic dependency graph mapping the inter-dependency of each partitioned data block 60 within the line item 50 shown in FIG. 3(a). The processor 24 is arranged to create this directed acyclic dependency graph. The invention aims to ensure that data blocks have no internal dependencies. Dependency graphs are well-known in the art and are not discussed further here.

The processor 24 is arranged to update the data blocks based on the dependency graph when the model is changed in some way, for example when at least one data cell 52 in the line item 50 is changed. The updating may be achieved in practice using well-known techniques for updating partition data based on a dependency graph. One example is a topological sort routine. Normally, all data cells 52 within a data block 60 would be recalculated.

By partitioning the data in this way, a relatively simple and efficient system for updating data within a business planning tool 10 is provided. Update speeds are significantly increased.

Figure 4:
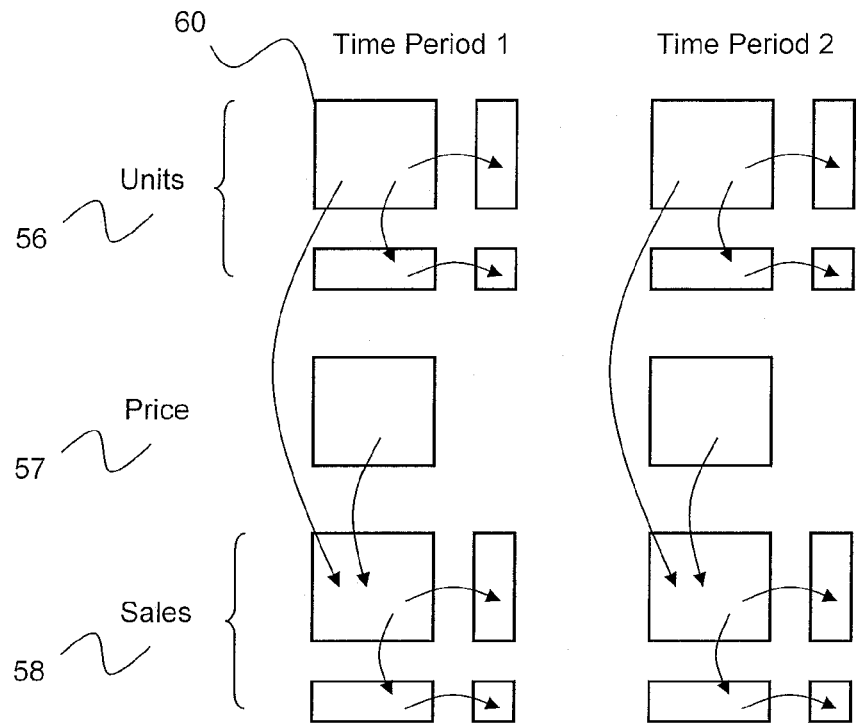
FIG. 4 is a schematic view of three partitioned line items showing an associated dependency graph.

FIG. 4 shows a slightly more complicated arrangement using three line items 56, 57, 58 each having three dimensions. In particular, the three line items 56, 57, 58 contain distinct operational data, namely information relating to units, price and sales respectively. The three line items 56, 57, 58 contain information on products and branches over two time periods, namely time period 1 and time period 2. As can be seen, data cells 52 from different hierarchy levels and time periods have been identified and grouped separately into different data blocks 60. The line item relating to price has no hierarchy levels.

Also, FIG. 4 shows the inter-dependency of a number of data blocks originating from distinct line items 50. In this example, only leaf-level, or level 0, data blocks feed into dependent data blocks in other line items 50. That is, leaf-level data relating to the number or units sold and leaf-level data relating to the price per item both feed into the sales line item in order to generate sales figures. In the exemplary embodiment, this leaf-level information is then used to calculate higher-than-leaf-level-data within the sales line item.

Of course, higher-level data blocks may feed into data blocks in other line items 50, and data blocks of different levels may be inter-dependent.

In the exemplary embodiment, at least one line item of the plurality of line items 50 may exist in a plurality of different versions. In this case, the processor 24 is arranged to partition the respective line items of different versions by identifying and grouping data cells which correspond to a single version. This introduces flexibility into the system, thereby allowing the system to cope with users having different versions for parts of a planning model. This also allows different derivations to be used within different versions, and hence the resulting different dependencies are handled according to the invention to achieve manageable node count and a directed acyclic graph. This holds a key advantage over adding a "version dimension" as done for planning tools using cubes, such as the Cognos 8® system.

Figure 5:
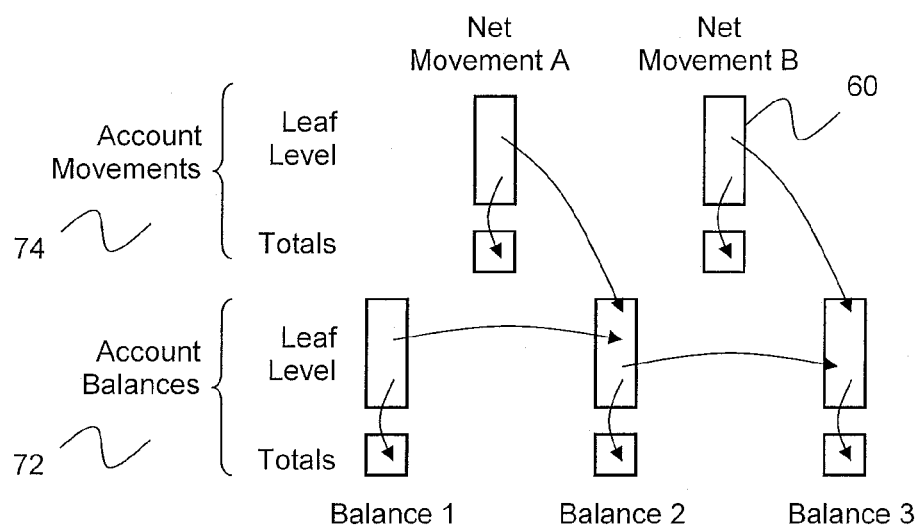
FIG. 5 is a schematic view of two line items partitioned into data blocks and demonstrating time dependency.

FIG. 5 is a schematic view representing how balances and movements are handled by the system of the present invention.

Two line items 72, 74 are shown. Line item 72 is arranged to hold account balances at several time stages in the planning model. The time stages are labelled "Balance 1", Balance 2" and "Balance 3" and have been partitioned separately. Line item 74 is arranged to hold account movement information representing periods between the respective account balances. The account movement information is labelled "Net Movement A" and Net Movement B" and has been partitioned separately. Net movement A corresponds to the period between Balance 1 and Balance 2. Net movement B corresponds to the period between Balance 2 and Balance 3. In this example, an account balance at a particular time stage relies on the previous account balance summed with the net account movement of the period in between. Partitioning data cells by a single time period within each respective line item 50 is necessary to prevent complex dependencies in the resulting dependency graph.

However, in other situations where there is no inter-time-period dependency it is possible to partition each line item in such a way that data cells from different time periods are identified and grouped together into a single data block.

In this way, the node count in a dependency graph can be further reduced without introducing complex dependencies in a dependency graph, and thus maintaining the acyclic nature of the graph.

Also, it may be that multiple hierarchy levels exist along the time dimension. In this case, the processor 24 is arranged to partition the data cells which belong to a single hierarchy along the time dimension. In this way, if a hierarchy exists in the time dimension, complex dependencies can be avoided.

Also, in the exemplary embodiment, the processor 24 is arranged to identify and group data cells into coarser partitions under one or more predetermined conditions. The predetermined conditions ensure that all data cells within each data block contain either primary data or secondary data derived from data cells in one or more other data blocks.

Figure 6:
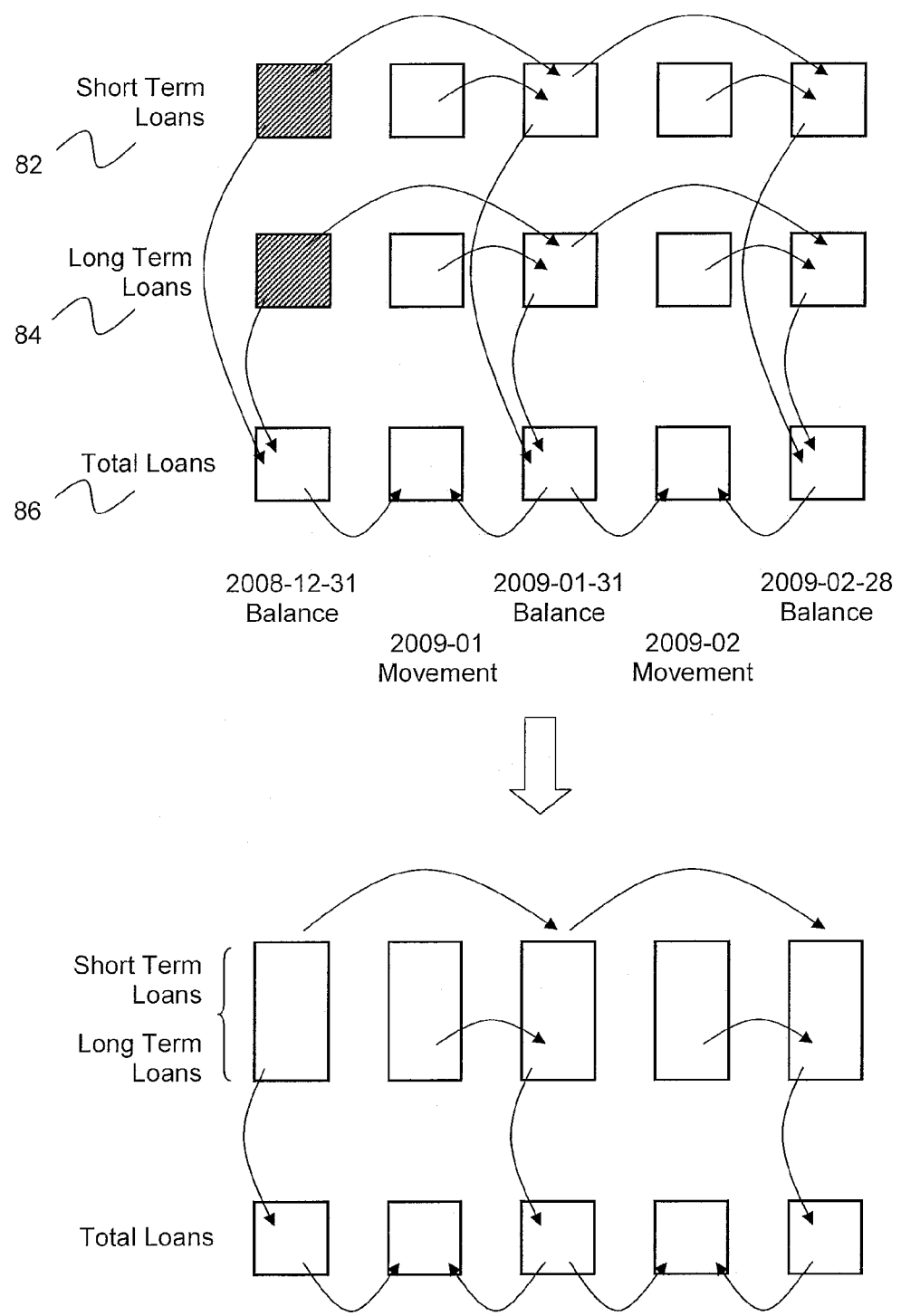
FIG. 6 is a schematic view of three line items partitioned into data blocks and demonstrating amalgamation of data blocks of different line items.

An example of this is shown in FIG. 6. Here, three interdependent line items 82, 84, 86, namely "Short Term Loans", "Long Term Loans" and "Total Loans" respectively, have been partitioned into data blocks in accordance with the invention. Hierarchy levels within each line item have been omitted to improve clarity. In this case, each line item 82, 84, 86 contains both balance and movement information. The processor 24 is arranged to detect this arrangement and partition the data cells contained in each respective line item 82, 84, 86 into separate data blocks 60 for each balance time stage and movement time period.

In this example, the processor 24 is arranged to detect that line items 82, 84 share a common structure and have primary data at the leaf level. Primary data is data at the leaf level which is non-dependent. In other words, the data is entered directly by a user or is uploaded to the memory 22 from a source external to the business planning tool 10. This source could be a spreadsheet or database in practice. Then, once the processor 24 has detected that line items 82, 84 meet the above requirements, the processor 24 is arranged to identify and group data cells from respective corresponding levels in the hierarchy from line items 82, 84 into data blocks. This again reduces node count in the dependency graph, greatly improving the updating process. In practice, this mode of operation is optional and may or may not be used depending on preference settings in the business planning tool 10.

Figure 7:
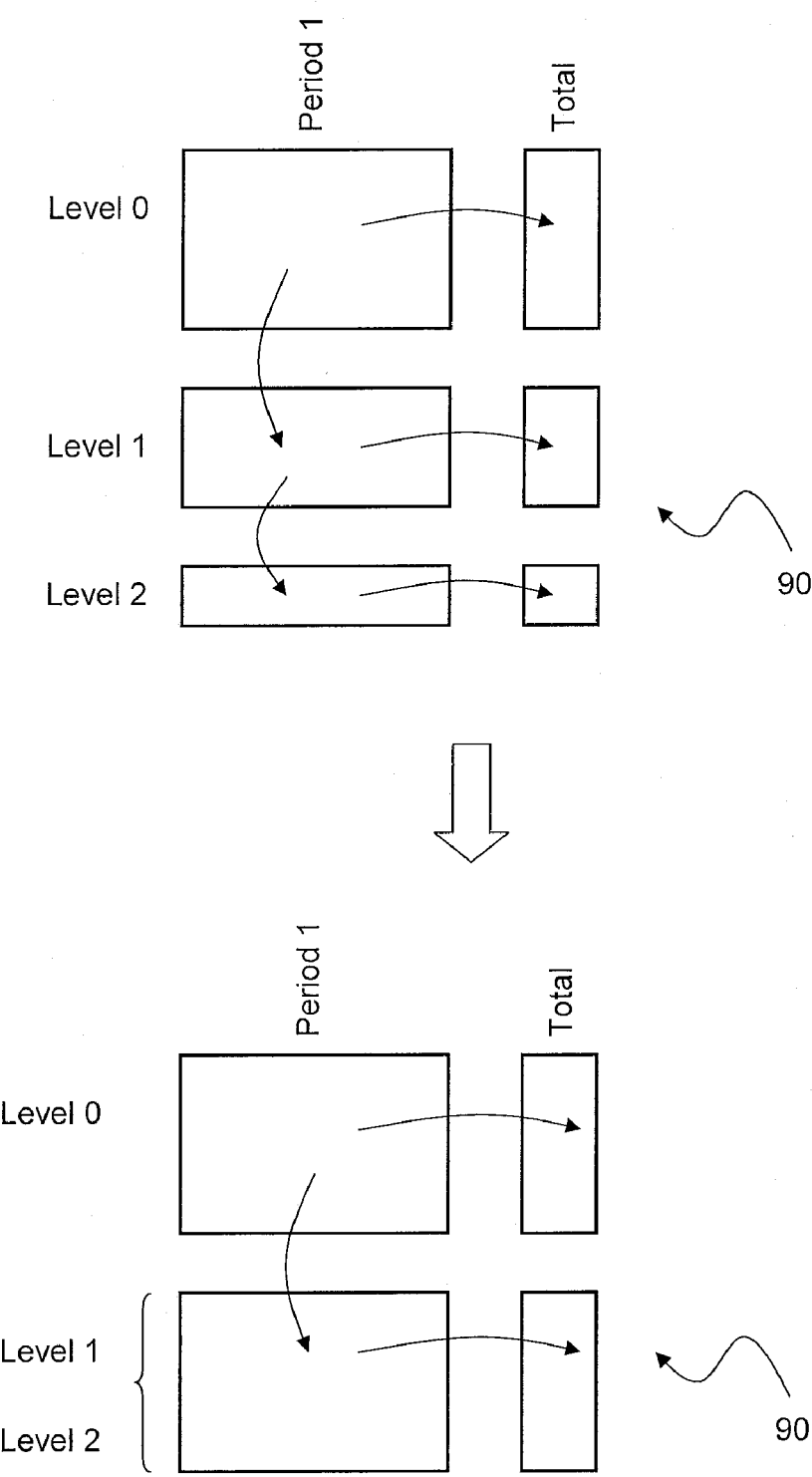
FIG. 7 is a schematic view of a single line item partitioned into data blocks and demonstrating amalgamation of data blocks of higher-than-leaf-level hierarchy levels within a single line item.

Referring now to FIG. 7, another method of more coarsely partitioning data cells into data is illustrated. In this case, data blocks corresponding to known-leaf hierarchy levels within a line item 90 are amalgamated with other data blocks within each respective hierarchy level. To achieve this without introducing complex dependencies within the dependency graph, all data cells within the corresponding amalgamated data blocks are re-expressed in terms of leaf-level data where appropriate. In this case, the level 2 hierarchy level data cells are re-expressed in terms of the level 0 data cells instead of level 1 data cells.

The updating process is now discussed in more detail. Previously, it has been assumed that the processor 24 is arranged to recalculate entire data blocks using known updating processes. However, under certain circumstances, it is advantageous to selectively update data cells within data blocks.

In an exemplary embodiment of the invention, this is achieved by recording, for each data block affected by user change, a selective list containing a list of affected data cells within the respective data block. This list is recorded where only a selective change to the data cells within a data block is to be carried out. For example, if all data cells within a data block are to be changed, then a selective list is not recorded.

A processor 24 is arranged to map changes through the system using the dependency graph in the normal way. However, the processor 24 is arranged to identify, for each dependent data block to be updated, all predecessor data blocks which are to be selectively updated. If all the predecessor data blocks which have changed are to be selectively updated, then the corresponding selective list or lists are obtained and transformed into a corresponding selective list of affected cells for the respective dependent data block. Then, the processor 24 is arranged to recalculate the data cells within each dependent data block to be updated using the respective selective list of affected cells.

Figure 8:
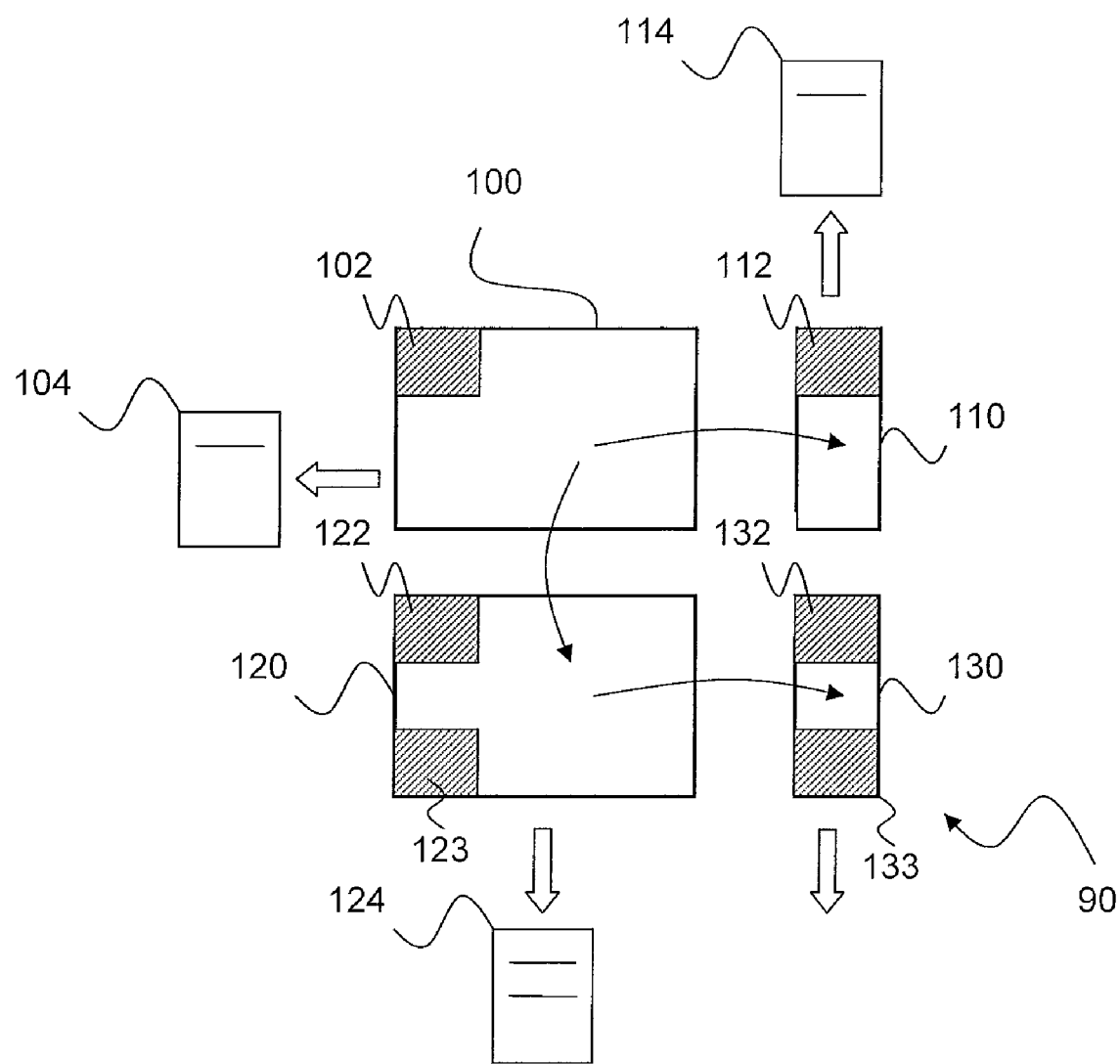
FIG. 8 is a schematic view of a selective updating process.

This is illustrated in FIG. 8 which shows line item 90 partitioned into four data blocks 100, 110, 120, 130. In this example, a single data cell 102 within data block 100 is to be changed by a user. A selective list 104 is generated and recorded in the memory 22. The processor 24 is arranged to identify all dependent data blocks 110, 120, 130 from the dependency graph as indicated in FIG. 8 by arrows. Normally, all data cells in each of the affected data blocks would be re-calculated. However, this is computationally inefficient.

The processor 24 is arranged to selectively update data block 100 based on the selective list 104. In this case, only data cell 102 is recalculated, thus saving processor time.

Also, the processor 24 is arranged to selectively update data block 110 which depends from predecessor data block 100 in the dependency graph. In this case, the processor 24 identifies the selective list 104 associated with the predecessor data block 100 and transforms the selective list 104 into selective list 114 which is associated with data block 110. In this case, data cell 112 is listed as an affected cell in the selective list 114. Only data cell 112 is recalculated, thus saving processor time.

The processor 24 identifies that data block 120 is also dependent on predecessor data block 100 from the dependency graph. The processor 24 identifies the selective list 104 associated with the predecessor data block 100 and transforms the selective list 104 into selective list 124 which is associated with data block 110. In this case, data cells 122, 123 are listed as affected cells in the selective list 124. This is because level 1 and level 2 hierarchy levels have been merged as discussed with reference to FIG. 7. Both data cells 122, 123 depend on data cell 102. Within data block 124, only data cells 122, 123 are recalculated, thus saving processor time.

This process is repeated for data block 130 which is in turn dependent on data block 120. However, the processor 24 is arranged to determine whether the number of affected data cells in data block 130 exceeds a predetermined threshold value. In this case, data block 130 contains three data cells. Two of the data cells 132, 133 are affected. The processor decides that this ratio exceeds the predetermined threshold and re-calculates the entire data block 130. Also the processor does not record a selective list for data block 130. The predetermined threshold is determined based on a cost/benefit analysis within the business planning tool 10. Updating every cell in an affected data block is expensive, but so is merging and transforming selective lists of predecessor data blocks. The threshold is usually set for maximum system efficiency.

In this way, the system can be made more efficient. By not updating data blocks at a cell level when more than a predetermined number of data cells are affected, the process of merging and transforming the selective lists of predecessor data blocks is avoided. This is particularly useful with process of merging and transforming would take more resources than a full data block update.

Also, by not recording a selective list for data block 130, an elegant mechanism is provided for preventing increasingly large selective lists from propagating through the system during an update process. This is particularly useful where a change to a small number of data cells grows to become a relatively large and expensive change in subsequent levels of the dependency graph.

In the exemplary embodiment described, the system is implemented in Java® and operates in a Microsoft® operating system, Mac OS/X operating system or Linux operating system.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for updating data within a business planning tool, the apparatus comprising:
   a computer memory arranged to store operational data in a plurality of line items, each line item being arranged to represent operational data in data cells, the data cells occupying space in a plurality of dimensions and being arranged to store either primary data sourced externally from the apparatus or secondary data derived from other data cells within the apparatus, and each line item having data cells in a first dimension configured to represent the operational data in at least one hierarchy level which consists of data cells arranged to store either primary data or secondary data, and each line item having data cells in a second dimension arranged to represent the respective operational data over at least one time period; and
   a processor arranged to:
   (i) partition each line item into data blocks comprising one or more data cells by identifying and grouping data cells which belong to a common hierarchy level within the first dimension and a single time period within the second dimension so that each data block either contains primary data or secondary data derived from data cells in one or more other data blocks;
   (ii) create a directed acyclic dependency graph having a node for each data block and which is arranged to represent the inter-dependency of the data blocks; and
   (iii) update the data blocks based on the directed acyclic dependency graph when at least one data cell is changed.

2. The apparatus of claim 1, wherein at least one line item of the plurality of line items exists in a plurality of different versions, and the processor is arranged to partition the respective line items of different versions by identifying and grouping data cells which correspond to a single version.

3. The apparatus of claim 1, wherein the processor is arranged to identify and group data cells into coarser partitions under one or more predetermined conditions which ensure that all data cells within each data block contain either primary data or secondary data derived from data cells in one or more other data blocks.

4. The apparatus of claim 3, wherein a predetermined condition is that data cells belonging to two or more independent time periods and a common hierarchy level within a line item are identified and grouped into a data block.

5. The apparatus of claim 4, wherein a further condition is that, where the time dimension comprises a plurality of hierarchy levels, data cells which belong to different time hierarchy levels are identified and grouped into separate data blocks.

6. The apparatus of claim 3, wherein a predetermined condition is that two or more line items share a common structure and have data entry at a leaf level in the hierarchy, and the data cells from respective corresponding levels in the hierarchy from the two or more line items are identified and grouped into a data block.

7. The apparatus of claim 3, wherein a predetermined condition is that, within a line item, data cells within non-leaf hierarchy levels in a single dimension are identified and grouped into a data block, and data held within the data block is re-expressed in terms of leaf-level data wherever necessary.

8. The apparatus of claim 1, wherein the processor is arranged selectively to update data cells within the data blocks by:
- recording, for each data block affected by a user change, a selective list containing a list of affected data cells within the respective data block.

9. The apparatus of claim 8, wherein the processor is arranged selectively to update data cells within the data blocks by:
- mapping changes through the apparatus using the dependency graph; and
- identifying, for each dependent data block to be updated, if predecessor data blocks exist which are to be selectively updated, and if so requesting the corresponding selective list or lists and transforming the corresponding selective list or lists into a selective list of affected cells for the respective dependent data block; and
- re-calculating the data cells within each dependent data block to be updated using the respective selective list of affected cells.

10. The apparatus of claim 9, wherein the processor is arranged to update all data cells within a data block if more than a predetermined portion of data cells are affected.

11. The apparatus of claim 10, wherein the processor is arranged not to record a selective list for a data block if more than a predetermined portion of data cells are affected.

12. A method of updating data within a computer-implemented business planning tool, the method comprising:
- arranging and storing in a computer memory operational data in a plurality of line items, each line item being arranged to represent operational data in data cells, the data cells occupying space in a plurality of dimensions and being arranged to store either primary data sourced externally from the business planning tool or secondary data derived from other data cells within the business planning tool, and each line item having data cells in a first dimension configured to represent the operational data in at least one hierarchy level which consists of data cells arranged to store either primary data or secondary data, and each line item having data cells in a second dimension arranged to represent the respective operational data over at least one time period;
- partitioning each line item into data blocks comprising one or more data cells by identifying and grouping data cells which belong to a common hierarchy level within the first dimension and a single time period within the second dimension so that each data block either contains primary data or secondary data derived from data cells in one or more other data blocks;
- creating a directed acyclic dependency graph having a node for each data block and which is arranged to represent the inter-dependency of the data blocks; and
- updating the data blocks based on the directed acyclic dependency graph when at least one data cell is changed.

13. A computer readable recording medium having recorded thereon instructions for causing a computer processor to carry out the steps of:
- arranging and storing in a computer memory operational data in a plurality of line items, each line item being arranged to represent operational data in data cells, the data cells occupying space in a plurality of dimensions and being arranged to store either primary data sourced externally from a business planning tool or secondary data derived from other data cells within the business planning tool, and each line item having data cells in a first dimension configured to represent the operational data in at least one hierarchy level which consists of data cells arranged to store either primary data or secondary data, and each line item having data cells in a second dimension arranged to represent the respective operational data over at least one time period;
- partitioning each line item into data blocks comprising one or more data cells by identifying and grouping data cells which belong to a common hierarchy level within the first dimension and a single time period within the second dimension so that each data block either contains primary data or secondary data derived from data cells in one or more other data blocks;
- creating a directed acyclic dependency graph having a node for each data block and which is arranged to represent the inter-dependency of the data blocks; and
- updating the data blocks based on the directed acyclic dependency graph when at least one data cell is changed.

* * * * *